3,270,056
N-ALKYNYL-NAPHTHYLALKYLAMINES
William Brady Martin and Leo Ralph Swett, Waukegan, Ill., assignors to Abbott Laboratories, North Chicago, Ill., a corporation of Illinois
No Drawing. Original application Oct. 27, 1961, Ser. No. 148,041, now Patent No. 3,211,741, dated Oct. 12, 1965. Divided and this application Jan. 5, 1965, Ser. No. 423,601
4 Claims. (Cl. 260—570.8)

This application is a division of our U.S. Serial No. 148,041, filed October 27, 1961, now U.S. Patent No. 3,211,741, granted October 12, 1965.

The present invention is directed to new propynylamines corresponding to the formula

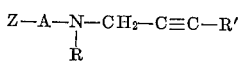

and their non-toxic, acid-addition salts as well as to methods for their preparation. In this and succeeding formulas, Z represents naphthyl; A represents a straight or branched loweralkylene radical; R represents hydrogen or methyl and R' represents hydrogen, loweralkyl or benzyl. The terms "loweralkyl" and "loweralkylene" as employed herein refer to the alkyl and alkylene radicals from 1 to 6 carbon atoms, inclusive.

The new compounds in their free base form are colorless liquids somewhat soluble in many organic solvents and of very low solubility in water. The liquid bases can be best isolated in the form of their solid salts such as the hydrobromides, hydrochlorides, benzoates, sulfates, phosphates, citrates, acetates, lactates, salicylates, succinates, fumarates, malates and like non-toxic salts. The salts are best prepared by reacting the free base with a stoichiometric amount of the desired organic or inorganic acid in a suitable solvent such as ethanol, acetone, ether or mixtures thereof. The amines and their non-toxic, acid-addition salts are active monoamine oxidase inhibitors and are accordingly useful in treating warm blooded animals in order to counteract the annoying symptoms of depression. In a representative operation, complete inhibition of monoamine oxidase was obtained in mice when N - (2-naphthylmethyl)-N-methyl-2-propynylamine was administered orally at a dosage of 50 mg. per kg. of body weight.

The new propynylamines wherein R' is hydrogen can be prepared by the reaction of one molecular proportion of propargyl bromide or propargyl chloride with at least one molecular proportion of a cyclic amine of the formula

Z—A—NHR preferably in an inert, organic solvent such as carbon tetrachloride, chloroform, methylene chloride, methanol, ethanol, benzene, ether or acetone. A hydrohalide acceptor such as potassium carbonate or triethylamine is usually employed. The reaction takes place smoothly at from room temperature to the reflux temperature of the reaction mixture with the formation of the desired product and amine hydrohalide of reaction.

In practice, the propargyl halide is added slowly to the amine and the hydrohalide acceptor, if employed, dispersed in the reaction solvent. If desired, the order of addition of the reactants can be reversed. In either case, the addition is carried out with stirring and under the aforementioned temperature conditions. When the reaction is complete, the solid salts formed are removed by filtration and washed with acetone. Upon removal of the solvent, the residue is fractionally distilled under reduced pressure to obtain the desired product as the free base which can be treated with ethereal hydrogen chloride at room temperature to obtain the solid HCl salt.

The propynylamines wherein R' is loweralkyl or benzyl are prepared by the reaction of equimolecular proportions of a benzyl halide or loweralkyl halide with the sodium salt of an amine of the formula

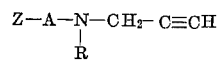

in ammonia at room temperature or below. Upon evaporation of the ammonia, the residue is fractionally distilled to obtain the desired propynylamine.

The examples which follow illustrate the invention and are not to be construed as limitations thereof.

EXAMPLE 1

N-1-naphthylethyl-2-propynylamine

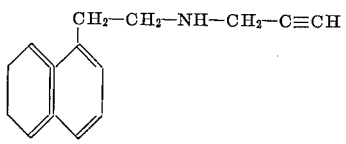

One mole of propargyl bromide is added portionwise with stirring to two moles of 1-naphthylethylamine dispersed in 200 ml. of methylene chloride at room temperature. The reaction mixture is then refluxed for 4 hours to complete the reaction as evidenced by the precipitation of the by-product 1-naphthylethylamine hydrobromide as a white solid. The amine hydrobromide is separated by filtration and the filtrate dried over anhydrous magnesium sulfate. Upon removal of the solvent and distillation of the residue under reduced pressure, the desired product is obtained as a colorless liquid having a molecular weight of 209.

In a similar manner employing acetone as a reaction medium, other cyclic amines shown in the following table were reacted with propargyl bromide to obtain the corresponding cyclic N - methyl - 2 - propynylamines which when reacted with ethereal hydrogen chloride produced the corresponding hydrogen chloride salts.

| Ex. No. | Cyclic amine Employed, R—CH₂—NH—CH₃ wherein R is | N-methyl-2-propynyl-amine obtained | B.P. in °C./mm. of amine obtained | M.P. in °C. of HCl salt of amine obtained |
|---|---|---|---|---|
| 2 | 1-napthyl | 1-naphthyl-methyl-. | 104/0.15 | 192 |
| 3 | 2-naphthyl | 2-naphthyl-methyl-. | 115/0.4 | 155 |

What we claim is:

1. A compound selected from the group consisting of cyclic propynylamines of the formula

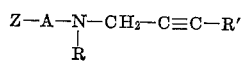

and their non-toxic, acid-addition salts in which Z is naphthyl, A is a member of the group consisting of methylene and ethylene, R is a member of the group consisting of hydrogen and methyl and R' is a member of the group consisting of hydrogen, and benzyl.

2. N-(1-naphthylmethyl)-N-methyl-2-propynylamine.
3. N-(2-naphthylmethyl)-N-methyl-2-propynylamine.
4. N-(1-naphthylethyl)-2-propynylamine.

References Cited by the Examiner

UNITED STATES PATENTS

| | | | |
|---|---|---|---|
| 2,884,455 | 4/1959 | Robertson et al. | 260—570.8 |
| 3,079,403 | 2/1963 | Weinstock | 260—570.5 X |
| 3,160,664 | 12/1964 | Dawson | 260—570.5 |

OTHER REFERENCES

Taylor et al.: "Nature," vol. 187, pp. 941–2 (1960).

CHARLES B. PARKER, *Primary Examiner.*

ROBERT V. HINES, *Assistant Examiner.*